Wilson & Beckwith,
Capstan.
Nº 238. Patented June 15, 1837.
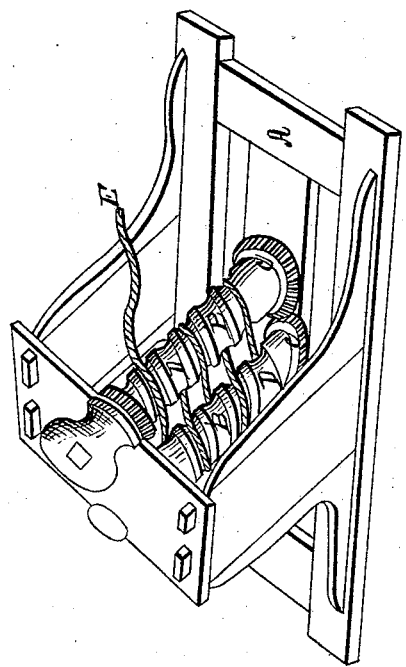

UNITED STATES PATENT OFFICE.

INCREASE WILSON AND FRANCIS D. BECKWITH, OF NEW LONDON, CONNECTICUT.

CAPSTAN FOR SHIPS AND OTHER PURPOSES.

Specification of Letters Patent No. 238, dated June 15, 1837.

*To all whom it may concern:*

Be it known that we, INCREASE WILSON and FRANCIS D. BECKWITH, both of the town of New London, in the county of New London and State of Connecticut, have invented a new and useful Improvement on a Machine called "Capstan," (for heaving out and hauling up ships, &c.;) and we do hereby declare that the following is a full and exact description.

The nature of our invention consists in providing a capstan with barrels, having scores and wheels so arranged, and connected together on the frame, as to obviate the inconvenience and detention occasioned by fleeting, or surging, which generally attends those in common use.

To enable others skilled in the art to make and use our invention, we will proceed to describe its construction and operation. We construct the capstan in the usual forms, with one barrel which between the bottom, and top of the frame, may be one foot in diameter—which barrel we call the working barrel—and (as usual) is fitted with holes on the end which projects above the top of the frame, for the purpose of receiving the lever by which it is worked in the common way—then in order to obviate the inconvenience of fleeting, we make a second barrel similar to the working barrel, except that it does not project above the top of the frame, but is attached to the frame directly opposite to the working barrel, with pivots on which it turns, leaving a space between the two barrels of six inches.

In order to give uniform motion to the second barrel, we secure a cast iron wheel eighteen inches in diameter, and three inches thick, (with or without cogs) on the lower end of each barrel, just above the bottom of the frame, and also secure one of the same description, on the upper end of each barrel, just below the top of the frame.

The barrels are so placed on the frame, as to permit the wheels to come in contact with each other at the top and bottom, and in order to conduct the rope uniformly on and from one barrel to the other, we cut six or eight scores somewhat larger than the rope directly around each barrel between the wheels. The rope is rove commencing on a score near the bottom of one barrel, crossing alternately between the barrels, on to the next score above on the other barrel, thus continuing up from one barrel to the other, until sufficient rope is rove to prevent slipping.

By the foregoing arrangement, it may be seen that when the end of the rope at the bottom of the barrel is made fast to a ship, and the working barrel turned in the usual way—the wheels of the two barrels will be compressed hard together by the rope, and thereby cause both barrels to move with uniform speed in opposite directions, so that any length of rope may be made to pass uniformly and steadily on and off through the scores of the barrels.

The accompanying drawings represent the capstan with what we claim as our invention. A the frame. B the two barrels. C four connecting wheels one of which is secured on each end of the barrels. D, the scores to guide the rope. E, the rope (which is intended to be crossed, each turn made around the barrel). The size of the barrels, wheels and scores, as also their number may be varied, and also the materials of which they are made.

Therefore what we claim as our invention, and desire to secure by Letters Patent, is—

The combination (as before described) of two barrels with wheels, scores and rope, so arranged as to receive the rope uniformly on to one end of the barrels, and conduct it steadily on and off the other, as before specified.

New London Feby 8th 1837.

INCREASE WILSON.
FRANCIS D. BECKWITH.

Signed in presence of—
NATHAN BECKWITH,
WM. F. BRAINARD.